US012568505B2

(12) United States Patent
Shi et al.

(10) Patent No.: US 12,568,505 B2
(45) Date of Patent: Mar. 3, 2026

(54) METHODS AND SYSTEMS FOR DETERMINING DOWNLINK CONTROL INFORMATION IN WIRELESS NETWORKS

(71) Applicant: ZTE Corporation, Guangdong (CN)

(72) Inventors: Jing Shi, Shenzhen (CN); Peng Hao, Shenzhen (CN); Xingguang Wei, Shenzhen (CN); Kai Xiao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 380 days.

(21) Appl. No.: 18/172,858

(22) Filed: Feb. 22, 2023

(65) Prior Publication Data

US 2023/0209565 A1      Jun. 29, 2023

Related U.S. Application Data

(63) Continuation of application No. PCT/CN2021/084872, filed on Apr. 1, 2021.

(51) Int. Cl.
| | |
|---|---|
| *H04W 72/23* | (2023.01) |
| *H04W 72/1263* | (2023.01) |
| *H04W 72/566* | (2023.01) |

(52) U.S. Cl.
CPC ....... *H04W 72/23* (2023.01); *H04W 72/1263* (2013.01); *H04W 72/566* (2023.01)

(58) Field of Classification Search
CPC ..... H04L 5/001; H04L 5/0053; H04L 5/0094; H04L 1/1642; H04L 1/1671; H04L 1/1887; H04L 5/0007; H04L 5/0048; H04L 5/0087; H04W 72/0446; H04W 72/23; H04W 72/046; H04W 72/1273; H04W 72/20
See application file for complete search history.

(56) References Cited

U.S. PATENT DOCUMENTS

| | | | | |
|---|---|---|---|---|
| 2020/0106592 A1* | 4/2020 | Soriaga | ................. | H04L 5/0094 |
| 2020/0351921 A1* | 11/2020 | Xu | ......................... | H04L 1/1887 |
| 2023/0111063 A1* | 4/2023 | Ji | ......................... | H04L 5/0057 |
| | | | | 370/329 |

FOREIGN PATENT DOCUMENTS

| | | | | |
|---|---|---|---|---|
| CN | 110475266 A | 11/2019 | | |
| EP | 4302442 A1 | 1/2024 | | |
| JP | 2024-513213 A | 3/2024 | | |
| WO | 2020017918 A1 | 1/2020 | | |
| WO | WO-2020072963 A1 * | 4/2020 | ........... | H04L 5/0053 |
| WO | 2020/146896 A1 | 7/2020 | | |
| WO | 2022/031379 A1 | 2/2022 | | |

(Continued)

OTHER PUBLICATIONS

ISA, International Search Report for International Application No. PCT/CN2021/084872, Mail Date: Jan. 6, 2022. (4 pages).

(Continued)

*Primary Examiner* — Romani Ohri

(74) *Attorney, Agent, or Firm* — Perkins Coie LLP

(57) ABSTRACT

Methods and systems for techniques for determining downlink control information in wireless networks are disclosed. In one example aspect, the method includes performing, by a wireless device, a determination of a maximum number of downlink control information (DCI) decodable by the wireless device within a time gap of a scheduling cell per a first number of scheduled cells, wherein the DCI is used to schedule downlink (DL) data or uplink (UL) data.

18 Claims, 11 Drawing Sheets

100

(56) References Cited

FOREIGN PATENT DOCUMENTS

WO          2022/205288 A1     10/2022

OTHER PUBLICATIONS

JPO, Office Action for Japanese Application No. 2023-560495, mailed on Oct. 22, 2024, 9 pages with unofficial English translation.
CIPO, Office Action for Canadian Application No. 3,215,715, mailed on Jan. 15, 2025, 4 pages.
Qualcomm Incorporated, "Cross-carrier scheduling from an SCell to the PCell/PSCell," 3GPP TSG RAN WG1 Meeting #104-e, E-meeting, R1-2101490, Jan. 25-Feb. 5, 2021, 9 pages.
Partial Supplementary European Search Report for European Patent Application No. 21933947.0 dated Apr. 8, 2024 (16 pages).
Qualcomm Incorporated, "Views on cross-carrier scheduling from an Scell to the Pcell/PSCell," 3GPP TSG RAN WG1 Meeting #103-e E meeting, Oct. 26 to Nov. 13, 2020, R1-2009277.
JPO, Notice of Allowance for Japanese Application No. 2023-560495, mailed on Mar. 24, 2025, 5 pages with unofficial English translation.
ZTE, "Discussion on Cross-Carrier Scheduling from SCell to PCell," 3GPP TSG RAN WG1 #104b-e, e-Meeting, R1-2102503, Apr. 12-20, 2021, 10 pages.
EPO, Communication pursuant to Article 94(3) EPC for European Application No. 21 933 947.0, mailed on Oct. 30, 2025, 7 pages.

* cited by examiner

100

Figure 11:
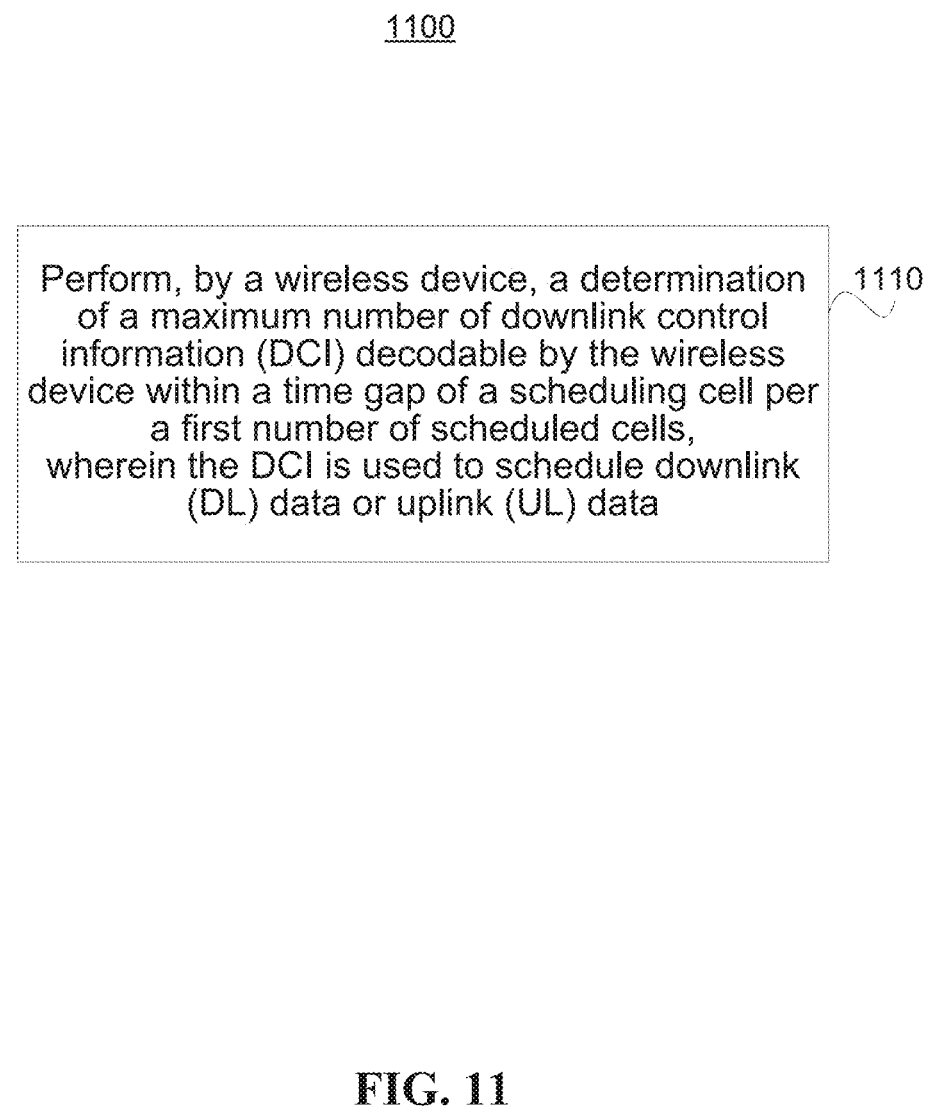

1100

Perform, by a wireless device, a determination
of a maximum number of downlink control
information (DCI) decodable by the wireless
device within a time gap of a scheduling cell per
a first number of scheduled cells,
wherein the DCI is used to schedule downlink
(DL) data or uplink (UL) data

METHODS AND SYSTEMS FOR DETERMINING DOWNLINK CONTROL INFORMATION IN WIRELESS NETWORKS

CROSS REFERENCE TO RELATED APPLICATIONS

This patent document is a continuation of and claims benefit of priority to International Patent Application No. PCT/CN2021/084872, filed on Apr. 1, 2021. The entire content of the before-mentioned patent application is incorporated by reference as part of the disclosure of this application.

TECHNICAL FIELD

Technical Field

This patent document is directed generally to wireless communications.

Background

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for determining downlink control information in wireless networks.

In one aspect, a method of data communication is disclosed. The method includes performing, by a wireless device, a determination of a maximum number of downlink control information (DCI) decodable by the wireless device within a time gap of a scheduling cell per a first number of scheduled cells, wherein the DCI is used to schedule downlink (DL) data or uplink (UL) data.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

BRIEF DESCRIPTION OF THE DRAWING

FIG. 11 shows an example of a process for wireless communication based on some example embodiments of the disclosed technology.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

For the 5th Generation mobile communication technology, Physical Downlink Control Channel (PDCCH) of Primary Cell (PCell) or Primary Secondary Cell Group Cell (PSCell) can schedule Physical Downlink Shared Channel (PDSCH) or Physical Uplink Shared Channel (PUSCH) on Secondary Cell (SCell). However, PDSCH or PUSCH on P(S)Cell cannot be scheduled by PDCCH of SCell. Given the dynamic spectrum sharing (DSS) in NR Rel-16, resources of PDCCH of P(S)Cell may be restricted. NR PDCCH enhancements for cross-carrier scheduling including PDCCH of SCell scheduling PDSCH or PUSCH on P(S)Cell is introduced to offload the P(S)Cell PDCCH, and thus the maximum number of unicast DCI that can be decoded by UE on the two scheduling cells for the same scheduled cell should be determined.

Figure 1:
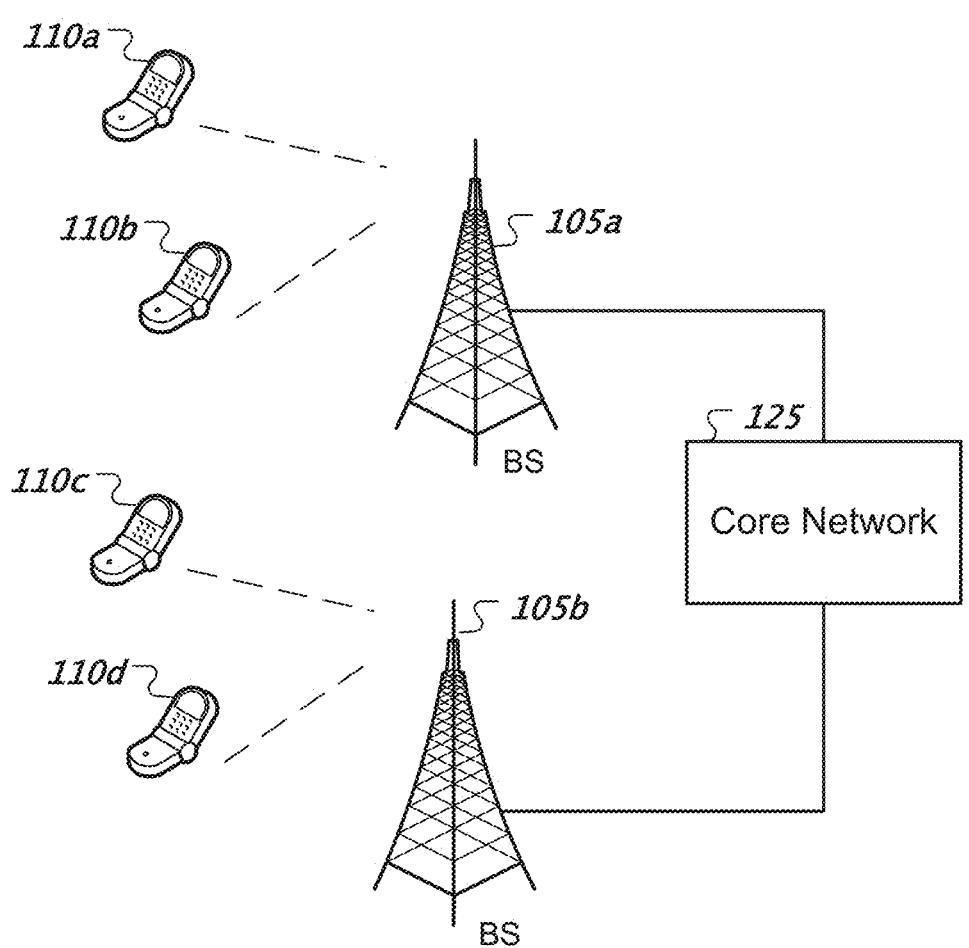
FIG. 1 shows a wireless communication system based on some example embodiments of the disclosed technology.

FIG. 1 shows an example of a wireless communication system 100 where techniques in accordance with one or more embodiments of the present technology can be applied. A wireless communication system 100 can include one or more base stations (BSs) 105a, 105b, one or more wireless devices 110a, 110b, 110c, 110d, and a core network 125. A base station 105a, 105b can provide wireless service to wireless devices 110a, 110b, 110c and 110d in one or more wireless sectors. In some implementations, a base station 105a, 105b includes directional antennas to produce two or more directional beams to provide wireless coverage in different sectors.

The core network 125 can communicate with one or more base stations 105a, 105b. The core network 125 provides connectivity with other wireless communication systems and wired communication systems. The core network may include one or more service subscription databases to store information related to the subscribed wireless devices 110a, 110b, 110c, and 110d. A first base station 105a can provide wireless service based on a first radio access technology, whereas a second base station 105b can provide wireless service based on a second radio access technology. The base stations 105a and 105b may be co-located or may be separately installed in the field according to the deployment scenario. The wireless devices 110a, 110b, 110c, and 1210d can support multiple different radio access technologies. The techniques and embodiments described in the present document may be implemented by the base stations of wireless devices described in the present document.

Figure 2:
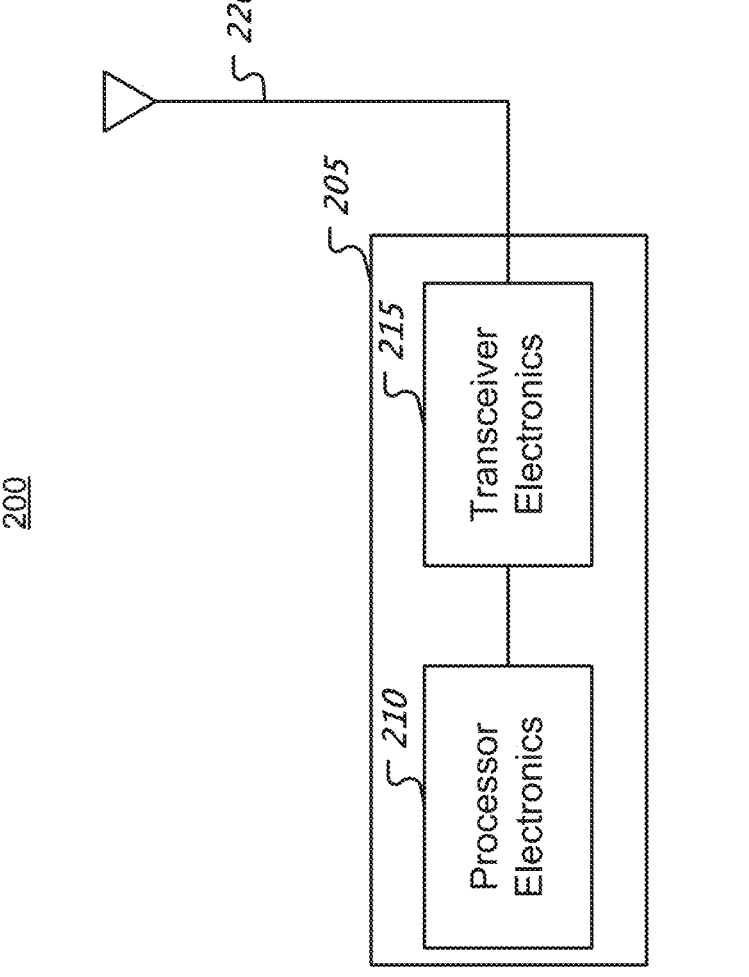
FIG. 2 shows a block diagram of a portion of a radio system based on some example embodiments of the disclosed technology.

FIG. 2 is a block diagram representation of a portion of a radio station in accordance with one or more embodiments of the present technology can be applied. A radio 205 such as a base station or a wireless device (or UE) can include processor electronics 210 such as a microprocessor that implements one or more of the wireless techniques presented in this document. The radio 205 can include transceiver electronics 215 to send and/or receive wireless signals over one or more communication interfaces such as antenna 220. The radio 205 can include other communication interfaces for transmitting and receiving data. Radio 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the radio 205. In some embodiments, the radio 205 may be configured to perform the methods described in this document. The network node described in the present application may be implemented using the above-described radio station or by using a hardware platform that includes a combination of one or more processors, one or more network interface hardware and one or more memories for storing processor-executable code or data.

With the increase in the demand for the 4th Generation mobile communication technology (4G) Long-Term Evolution (LTE) and LTE-Advance (LTE-A) and the 5th Generation mobile communication technology (5G) (spectrum used for 4G can be reused for 5G by DSS), there has arisen a need for developing technologies relating to enhanced mobile broadband (eMBB), ultra-reliable low-latency communication (URLLC), and massive machine-type communication (mMTC).

In the current 5G system, an SCell can be a scheduling cell or a scheduled cell, while P(S)Cell can be a scheduling cell and cannot be a scheduled cell. In the case where P(S)Cell can be both the scheduled cell and the scheduling cell, the maximum number of unicast DCI that can be decoded by UE on the two scheduling cells for the same scheduled cell should be determined.

For the UE feature of a downlink (DL) control channel and procedure, there is a basic UE feature FG (feature group) 3-1 and an enhanced UE feature FG 3-5b. It is to be noted that FG 3-1 and FG 3-5b are discussed in this patent document by way of example only, and they are not intended as being a limitation of UE features of a downlink (DL) control channel and procedures.

For FG 3-1, the maximum number of unicast DCI that can be decoded by UE for a scheduled cell is as follows:

Processing one unicast DCI scheduling DL and one unicast DCI scheduling UL per slot per scheduled CC for FDD; Processing one unicast DCI scheduling DL and 2 unicast DCI scheduling UL per slot per scheduled CC for TDD.

For FG 3-5b, the maximum number of unicast DCI that can be decoded by UE for a scheduled cell is as follows: For the set of monitoring occasions which are within the same span; Processing one unicast DCI scheduling DL and one unicast DCI scheduling UL per scheduled CC across this set of monitoring occasions for FDD; Processing one unicast DCI scheduling DL and two unicast DCI scheduling UL per scheduled CC across this set of monitoring occasions for TDD; Processing two unicast DCI scheduling DL and one unicast DCI scheduling UL per scheduled CC across this set of monitoring occasions for TDD.

Since SCell can only be either a scheduling cell or a scheduled cell, and P(S)Cell can only be a scheduling cell and cannot be a scheduled cell under the current 5G system, regardless of whether FG 3-1 or FG 3-5b or another FG applies, the function of monitoring PDCCH for the scheduled cell can only be performed by the scheduling cell, and a set of monitoring occasions within a slot or a span can also be determined by the scheduling cell.

In the case where P(S)Cell can be both the scheduled cell and the scheduling cell, the maximum number of unicast DCI that can be decoded by UE on the two scheduling cells for the same scheduled cell should be determined. In addition, the set of monitoring occasions within a slot or a span on the scheduling cell should be also determined.

The disclosed technology can be implemented based on some embodiments to determine the maximum number of unicast DCI that can be decoded by UE for a scheduled cell that has two scheduling cells, as will be discussed below.

Example Embodiment 1

The disclosed technology can be implemented based on some embodiments to determine the maximum number of unicast DCI that can be decoded by UE on the two scheduling cells for the same scheduled cell per slot of the first scheduling cell or the second scheduling cell or the scheduling cell with a higher SCS or the scheduling cell with lower SCS.

In Carrier Aggregation scenario, the configuring of the P(S)Cell (referred to as "Cell A") can be scheduled by SCell (referred to as "cell B"), and the Cell A can also support a self-scheduling scheme. For the Cell B, a configuring Cell B is a scheduling cell and supports the scheduling Cell A. Then the Cell A (scheduled cell) has two scheduling cells, which are Cell A (the first scheduling cell) and Cell B (the second scheduling cell). The maximum number of unicast DCI that can be decoded by UE on the two scheduling cells for the same scheduled Cell A should be determined.

The subcarrier spacing (SCS) of Cell A is $\mu1$, and the SCS of Cell B is $\mu2$. The potential values of the SCS are 15 kHz, 30 kHz, 60 kHz, 120 kHz, or other values.

For the scheduled Cell A with two scheduling cells, the maximum number of unicast DCI that can be decoded by UE is determined across the set of monitoring occasions within a slot of the first scheduling cell (Cell A with SCS=$\mu1$) or the second scheduling cell (Cell B with SCS=$\mu2$) or the scheduling cell with a higher SCS or the scheduling cell with a lower SCS. Optionally, the maximum number of unicast DCI may be: one unicast DCI scheduling DL and one unicast DCI scheduling UL for frequency division duplex (FDD); one unicast DCI scheduling DL and two unicast DCI scheduling UL for time division duplex (TDD); two unicast DCI scheduling DL and one unicast DCI scheduling UL for TDD.

Figure 3:
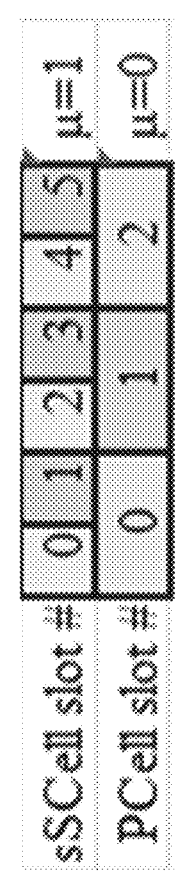
FIG. 3 shows an example of determining the maximum number of unicast DCI that can be decoded by UE across a set of monitoring occasions within a slot of a scheduling cell.
Figure 4:
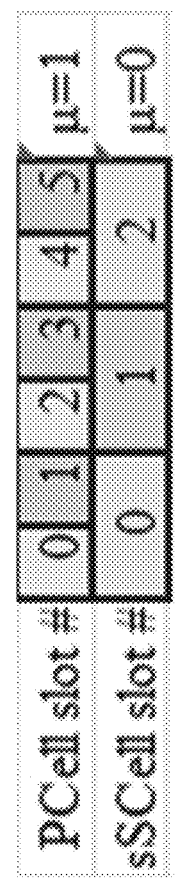
FIG. 4 shows another example of determining the maximum number of unicast DCI that can be decoded by UE across a set of monitoring occasions within a slot of a scheduling cell.

In some embodiments, FDD can be taken as an example, and the maximum number of unicast DCI that can be decoded by UE is determined across the set of monitoring occasions within a slot of the first scheduling cell (Cell A with SCS=μ1). In FIG. 3, the maximum number of unicast DCI that can be decoded by UE for the scheduled PCell with two scheduling cells is one unicast DCI scheduling DL and one unicast DCI scheduling UL across the set of monitoring occasions within a slot of the first scheduling cell (PCell with μ=0), processing one unicast DCI scheduling DL and one unicast DCI scheduling UL on two scheduling cells per 1 ms slot of the first scheduling cell or per scheduled cell. In FIG. 4, the maximum number of unicast DCI that can be decoded by UE for the scheduled PCell with two scheduling cells is one unicast DCI scheduling DL and one unicast DCI scheduling UL across the set of monitoring occasions within a slot of the first scheduling cell (PCell with μ=1), processing one unicast DCI scheduling DL and one unicast DCI scheduling UL on two scheduling cells per 0.5 ms slot of the first scheduling cell or per scheduled cell.

Similarly, the maximum number of unicast DCI that can be decoded by UE is determined across the set of monitoring occasions within a slot of the second scheduling cell (Cell B with SCS=μ2), or the scheduling cell with a higher SCS or the scheduling cell with a lower SCS. In one embodiment, the maximum number of unicast DCI that can be decoded by UE is determined across the set of monitoring occasions within a slot of the scheduling cell with a lower SCS. In FIG. 3, the maximum number of unicast DCI that can be decoded by UE for the scheduled PCell with two scheduling cells is one unicast DCI scheduling DL and one unicast DCI scheduling UL across the set of monitoring occasions within a slot of the first scheduling cell with lower SCS (PCell), processing one unicast DCI scheduling DL and one unicast DCI scheduling UL on two scheduling cells per 1 ms slot of the first scheduling cell or per scheduled cell. In FIG. 4, the maximum number of unicast DCI that can be decoded by UE for the scheduled PCell with two scheduling cells is one unicast DCI scheduling DL and one unicast DCI scheduling UL across the set of monitoring occasions within a slot of the scheduling cell with lower SCS (sSCell), processing one unicast DCI scheduling DL and one unicast DCI scheduling UL on two scheduling cells per 1 ms slot of the second scheduling cell.

Although the FDD is used as an example in some embodiments discussed in this patent document, the same principle applies to the TDD. Likewise, although PCell is used as an example in some embodiments discussed in this patent document, the same principle applies to PSCell.

In other embodiments, for the scheduled Cell A with two scheduling cells, the maximum number of unicast DCI that can be decoded by UE may be determined across the set of monitoring occasions within a slot of the first scheduling cell (Cell A with SCS=μ1) and the maximum number of unicast DCI that can be decoded by UE may be determined across the set of monitoring occasions within a slot of the second scheduling cell (Cell B with SCS=μ2). Optionally, for each scheduling cell of the scheduled cell, the maximum number of unicast DCI may be: one unicast DCI scheduling DL and one unicast DCI scheduling UL for FDD; one unicast DCI scheduling DL and two unicast DCI scheduling UL for TDD; two unicast DCI scheduling DL and one unicast DCI scheduling UL for TDD.

In some embodiments, the maximum number of unicast DCI that can be decoded by UE for the scheduled PCell with two scheduling cells is determined across the set of monitoring occasions within a time gap of one of the scheduling cells. This ensures the maximum number of unicast DCI that can be decoded by UE of a scheduled cell with two scheduling cells is determined clearly when the PCell is scheduled by SCell. This avoids the potential issue of PDCCH missing detection that otherwise would have occurred when the maximum number of unicast DCI that can be decoded by UE on the UE side is different from that on the gNB side.

Example Embodiment 2

The disclosed technology can be implemented based on some embodiments to determine the maximum number of unicast DCI that can be decoded by UE on the two scheduling cells for the same scheduled cell per span of one of the scheduling cells, according to at least one of: a cell priority, the number of span priority, a combination (X, Y) priority. Optionally, the two scheduling cells are both with a span-based monitoring feature (i.e. FG3-5b) and have the same SCS.

Here, X indicates a number of symbols corresponding to a minimum gap between starting symbols of two consecutive spans and Y indicates a maximum number of consecutive symbols for each span. In some implementations, the combination (X, Y) is reported from UE. Example values of the combination (X, Y) can include (7, 3), (4, 3), and (2, 2). There is a minimum time separation of X OFDM symbols between the start symbol of two spans, where each span is of length up to Y consecutive OFDM symbols of a slot. In one example, spans do not overlap, and every span is contained in a single slot.

In a carrier aggregation scenario, the configuring of P(S)Cell (referred to as "Cell A") can be scheduled by SCell (referred to as "Cell B"), and Cell A can also support a self-scheduling scheme. For Cell B, the configuring Cell B is a scheduling cell and supports the scheduling of Cell A. Then the Cell A has two scheduling cells, which are Cell A (the first scheduling cell) and Cell B (the second scheduling cell). The maximum number of unicast DCI that can be decoded by UE on the two scheduling cells for the same scheduled cell A should be determined.

The subcarrier spacing (SCS) of cell A is μ1, and the SCS of cell B is μ2. The potential values of the SCS are 15 kHz, 30 kHz, 60 kHz, 120 kHz or other values.

For the scheduled Cell A with two scheduling cells, the maximum number of unicast DCI that can be decoded by UE is determined across the set of monitoring occasions within a span of one of the scheduling cells. The one of the scheduling cell is determined according to at least one of: Cell priority, the number of span priority, Combination (X, Y) priority. Optionally, the maximum number of unicast DCI may be: one unicast DCI scheduling DL and one unicast DCI scheduling UL for FDD; one unicast DCI scheduling DL and two unicast DCI scheduling UL for TDD; two unicast DCI scheduling DL and one unicast DCI scheduling UL for TDD.

Method 1: At Step1, one of the scheduling cells is selected according to the combination (X, Y) priority. At Step2, if the combination (X, Y) is the same, one of the scheduling cells is selected according to the number of span priority. At Step3, if the combination (X, Y) is the same and the number of spans is the same, then one of the scheduling cells is selected according to the cell priority. In other implementations, one or more of the operations discussed above can be optional and the order of steps above can vary. For example, Step1, one of the scheduling cells is selected according to the number of span priority. At Step2, if the number of spans is the same, one of the scheduling cells is selected according to the combination (X, Y) priority. At Step3, if the combination (X, Y) is the same and the number of spans is the same, then one of the scheduling cells is selected according to the cell priority. For example, at Step1, one of the scheduling cells is selected according to the number of span priority. At Step2, if the number of spans is the same, one of the scheduling cells is selected according to the cell priority. For example, at Step1, one of the scheduling cells is selected according to the combination (X, Y) priority. At Step2, if the combination (X, Y) is the same, one of the scheduling cells is selected according to the cell priority. For example, one of the scheduling cells is selected according to the number of span priority. For example, one of the scheduling cells is selected according to the combination (X, Y) priority. For example, one of the scheduling cells is selected according to the cell priority.

Method 2: One of the scheduling cells is selected according to the cell priority.

Method 3: When all the UE specific search spaces (USS) for scheduling PCell are on the sSCell, the sSCell is selected as the one of the scheduling cell. When the USS for scheduling PCell is located on both the PCell and the sSCell, Method 1 or 2 may be used. Here, the sSCell may be an SCell that is configured to schedule a PCell.

Combination (X, Y) priority: Alternative 1 determines across the set of monitoring occasions within a span of the cell with a smaller X value. Alternative 2 determines across the set of monitoring occasions within a span of the cell with a larger X value. Note: For a cell, when multiple (X, Y) are reported, the above X is the X used to determine the span of the cell.

Number of Span Priority: Alternative 1 determines across the set of monitoring occasions within a span of the cell which has more spans in one slot. Alternative 2 determines across the set of monitoring occasions within a span of the cell that has less spans in one slot.

Cell Priority: Alternative 1 determines across the set of monitoring occasions within a span of the PCell (the first scheduling cell). Alternative 2 determines across the set of monitoring occasions within a span of the sSCell (the second scheduling cell).

Figure 5:
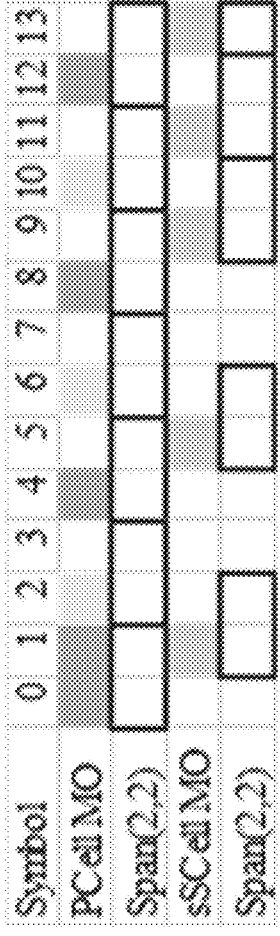
FIG. 5 shows an example of determining the maximum number of unicast DCI that can be decoded by UE across a set of monitoring occasions within a span of a scheduling cell.
Figure 6:
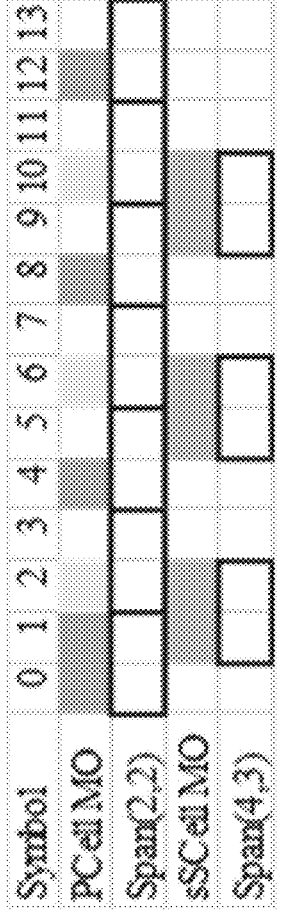
FIG. 6 shows another example of determining the maximum number of unicast DCI that can be decoded by UE across a set of monitoring occasions within a span of a scheduling cell.

In an embodiment where FDD is used as an example, the maximum number of unicast DCI that can be decoded by UE is determined across the set of monitoring occasions within a span of one of the scheduling cells according Method 1. In FIG. 5, using Method 1, a first check of the combination (X, Y) priority based on Alternative 1 determines across the set of monitoring occasions within a span of the cell with a smaller X value, and the two scheduling cells have the same combination (X, Y)=(2, 2). Then, a check of the number of span priority based on Alternative 1 determines across the set of monitoring occasions within a span of the cell that has more spans in one slot, and the first scheduling cell (PCell) is selected because it has more spans than the second scheduling cell (sSCell). The maximum number of unicast DCI that can be decoded by UE for the scheduled PCell with two scheduling cells is one unicast DCI scheduling DL and one unicast DCI scheduling UL across the set of monitoring occasions within a span of the first scheduling cell (PCell), processing one unicast DCI scheduling DL and one unicast DCI scheduling UL on two scheduling cells per span of the first scheduling cell. In FIG. 6, using Method 1, a first check of the combination (X, Y) priority based on Alternative 2 determines across the set of monitoring occasions within a span of the cell with a larger X value, then the second scheduling cell that has the combination (X, Y)=(4, 3) is selected. Then the maximum number of unicast DCI that can be decoded by UE for the scheduled PCell with two scheduling cells is one unicast DCI scheduling DL and one unicast DCI scheduling UL across the set of monitoring occasions within a span of the second scheduling cell (sSCell), processing one unicast DCI scheduling DL and one unicast DCI scheduling UL on two scheduling cells per span of the second scheduling cell.

Similarly, the maximum number of unicast DCI that can be decoded by UE is determined across the set of monitoring occasions within a span of one of the scheduling cells according Method 2. In one embodiment, the maximum number of unicast DCI that can be decoded by UE is determined across the set of monitoring occasions within a span of one of the scheduling cells according to cell priority. In FIG. 5, using Method 2, the maximum number of unicast DCI that can be decoded by UE for the scheduled PCell with two scheduling cells is one unicast DCI scheduling DL and one unicast DCI scheduling UL across the set of monitoring occasions within a span of one of the scheduling cells according to the cell priority. Alternative 1 determines across the set of monitoring occasions within a span of the PCell, processing one unicast DCI scheduling DL and one unicast DCI scheduling UL on two scheduling cells per span of the first scheduling cell (PCell). In FIG. 6, using Method 2, the maximum number of unicast DCI that can be decoded by UE for the scheduled PCell with two scheduling cells is one unicast DCI scheduling DL and one unicast DCI scheduling UL across the set of monitoring occasions within a span of one of the scheduling cells according to the cell priority. Alternative 2 determines across the set of monitoring occasions within a span of the sSCell, processing one unicast DCI scheduling DL and one unicast DCI scheduling UL on two scheduling cells per span of the second scheduling cell (sSCell).

Although the FDD is used as an example in some embodiments discussed in this patent document, the same principle applies to the TDD. Likewise, although PCell is used as an example in some embodiments discussed in this patent document, the same principle applies to PSCell.

In other embodiments, for the scheduled Cell A with two scheduling cells, the maximum number of unicast DCI that can be decoded by UE may be determined across the set of monitoring occasions within a span of the first scheduling cell (Cell A with SCS=$\mu1$) and the maximum number of unicast DCI that can be decoded by UE may be determined across the set of monitoring occasions within a span of the second scheduling cell (Cell B with SCS=$\mu2$). Optionally, for each scheduling cell of the scheduled cell, the maximum number of unicast DCI may be: one unicast DCI scheduling DL and one unicast DCI scheduling UL for FDD; one unicast DCI scheduling DL and two unicast DCI scheduling UL for TDD; two unicast DCI scheduling DL and one unicast DCI scheduling UL for TDD.

In some embodiments, the maximum number of unicast DCI that can be decoded by UE for the scheduled PCell with two scheduling cells is determined across the set of monitoring occasions within a time gap of one of the scheduling cells. This ensures the maximum number of unicast DCI that can be decoded by UE of a scheduled cell with two scheduling cells is determined clearly when the PCell is scheduled by SCell. This avoids the potential issue of PDCCH missing detection that otherwise would have occurred when the maximum number of unicast DCI that can be decoded by UE on the UE side is different from that on the gNB side.

Example Embodiment 3

The disclosed technology can be implemented based on some embodiments to determine the maximum number of unicast DCI that can be decoded by UE on the two scheduling cells for the same scheduled cell per span of one of the scheduling cell, according to at least one of: an SCS relationship between the two scheduling cells, per N spans, and a cell priority. Optionally, the two scheduling cells are both with a span-based monitoring feature (i.e. FG3-5b) and have different SCS.

In a carrier aggregation scenario, the configuring of the P(S)Cell (referred to as "Cell A") can be scheduled by SCell (referred to as "Cell B"), and Cell A can also support a self-scheduling scheme. For Cell B, the configuring Cell B is a scheduling cell and supports the scheduling of Cell A.

Then the Cell A has two scheduling cells, which are Cell A (the first scheduling cell) and Cell B (the second scheduling cell). The maximum number of unicast DCI that can be decoded by UE on the two scheduling cells for the same scheduled cell A should be determined.

The subcarrier spacing (SCS) of cell A is µ1, and the SCS of cell B is µ2. The potential values of the SCS are 15 kHz, 30 kHz, 60 kHz, 120 kHz or other values.

For the scheduled Cell A with two scheduling cells, the maximum number of unicast DCI that can be decoded by UE is determined across the set of monitoring occasions within a span of one of the scheduling cells. The one of the scheduling cells is determined according to at least one of: an SCS relationship between the two scheduling cells, per N spans, a cell priority. Optionally, the maximum number of unicast DCI may be: one unicast DCI scheduling DL and one unicast DCI scheduling UL for FDD; one unicast DCI scheduling DL and two unicast DCI scheduling UL for TDD; two unicast DCI scheduling DL and one unicast DCI scheduling UL for TDD.

Method 1: One of the scheduling cells is determined according to the SCS size relationship between the first scheduling cell (PCell) and the second scheduling cell (sSCell). When the SCS of the sSCell is smaller than the SCS of the PCell (small SCS scheduling large SCS), the span of one of the scheduling cells is sSCell. When the SCS of the sSCell is larger than the SCS of the PCell (large SCS scheduling small SCS), then Alternative 1 is used: the maximum number of unicast DCI that can be decoded by UE is determined across the set of monitoring occasions within a slot of sSCell, or Alternative 2 is used: the maximum number of unicast DCI that can be decoded by UE is determined across the set of monitoring occasions within a span of PCell.

Method 2: One of the scheduling cells is determined by configuring per N span(s) of the first scheduling cell (PCell) or the second scheduling cell (sSCell). Optionally, one of the scheduling cells is determined by configuring per N spans of the sSCell, or per span of PCell. For example, when the SCS of the sSCell is smaller than the SCS of the PCell (small SCS scheduling large SCS), one of the scheduling cells is determined by configuring per N=1 span of the sSCell; when the SCS of the sSCell is larger than the SCS of the PCell (large SCS scheduling small SCS), one of the scheduling cells is determined by configuring per N=2 of the sSCell.

Method 3: One of the scheduling cells is selected according to the cell priority. Alternative 1 determines across the set of monitoring occasions within a span of the PCell. Alternative 2 determines across the set of monitoring occasions within a span of the sSCell. Alternative 3 determines across the set of monitoring occasions within a span of the cell with a larger SCS. Alternative 4 determines across the set of monitoring occasions within a span of the cell with a smaller SCS.

Method 4: When all the USSs for scheduling PCell are on the sSCell, the sSCell is selected as the one of the scheduling cells. When the USS for scheduling PCell is located on both the PCell and the sSCell, Method 1, 2 or 3 is used.

Figure 7:
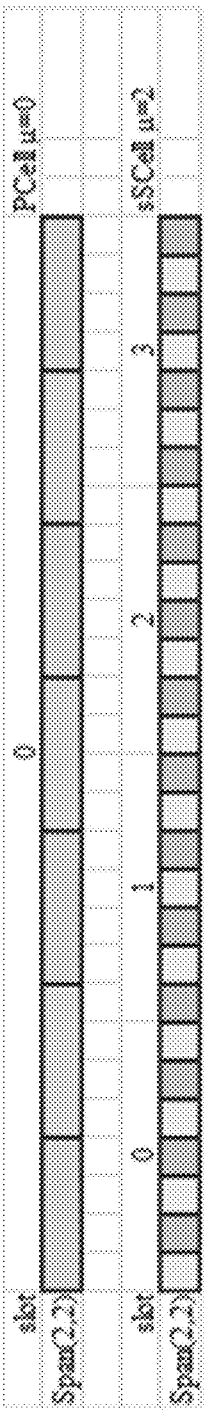
FIG. 7 shows an example of determining the maximum number of unicast DCI that can be decoded by UE across a set of monitoring occasions within a slot of sSCell or within a span of PCell.

In an embodiment where FDD is used as an example, the maximum number of unicast DCI that can be decoded by UE is determined across the set of monitoring occasions within a span of one of the scheduling cells according Method 1. In FIG. 7, using Method 1, the SCS of the sSCell is larger than the SCS of the PCell (large SCS scheduling small SCS), and using Alternative 1 the maximum number of unicast DCI that can be decoded by UE is determined across the set of monitoring occasions within a slot of sSCell. Then the maximum number of unicast DCI that can be decoded by UE for the scheduled PCell with two scheduling cells is one unicast DCI scheduling DL and one unicast DCI scheduling UL across the set of monitoring occasions within a slot of the sSCell, processing one unicast DCI scheduling DL and one unicast DCI scheduling UL on two scheduling cells per slot of the second scheduling cell. Or using Method 1 and using Alternative 2 the maximum number of unicast DCI that can be decoded by UE is determined across the set of monitoring occasions within a span of PCell. Then the maximum number of unicast DCI that can be decoded by UE for the scheduled PCell with two scheduling cells is one unicast DCI scheduling DL and one unicast DCI scheduling UL across the set of monitoring occasions within a span of the first scheduling cell (PCell), processing one unicast DCI scheduling DL and one unicast DCI scheduling UL on two scheduling cells per span of the first scheduling cell.

Figure 8:
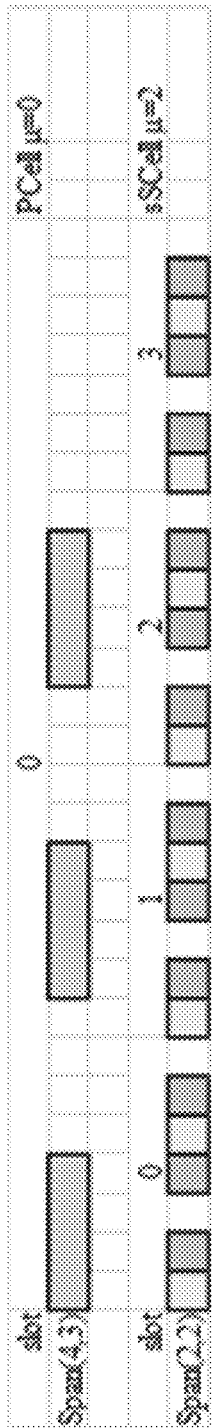
FIG. 8 shows an example of determining one of the scheduling cells by configuring per N span(s) of PCell or sSCell.

In an embodiment where FDD is used as an example, the maximum number of unicast DCI that can be decoded by UE is determined across the set of monitoring occasions within a span of one of the scheduling cells according Method 2. In FIG. 8, using Method 2, one of the scheduling cells is determined by configuring per N=2 spans of the second scheduling cell (sSCell). Then the maximum number of unicast DCI that can be decoded by UE for the scheduled PCell with two scheduling cells is one unicast DCI scheduling DL and one unicast DCI scheduling UL across the set of monitoring occasions within N=2 spans of the sSCell, processing one unicast DCI scheduling DL and one unicast DCI scheduling UL on two scheduling cells per N=2 spans of the second scheduling cell. Alternatively, Method 2 can be used to determine one of the scheduling cells by configuring per N=1 span of the first scheduling cell (PCell). Then the maximum number of unicast DCI that can be decoded by UE for the scheduled PCell with two scheduling cells is one unicast DCI scheduling DL and one unicast DCI scheduling UL across the set of monitoring occasions within a span of the first scheduling cell (PCell), processing one unicast DCI scheduling DL and one unicast DCI scheduling UL on two scheduling cells per span of the first scheduling cell.

Although the FDD is used as an example in some embodiments discussed in this patent document, the same principle applies to the TDD. Likewise, although PCell is used as an example in some embodiments discussed in this patent document, the same principle applies to PSCell.

In other embodiments, for the scheduled Cell A with two scheduling cells, the maximum number of unicast DCI that can be decoded by UE is determined across the set of monitoring occasions within a span of the first scheduling cell (Cell A with SCS=µ1) and the maximum number of unicast DCI that can be decoded by UE is determined across the set of monitoring occasions within a span of the second scheduling cell (Cell B with SCS=µ2) are determined respectively. Optionally, for each scheduling cell of the scheduled cell, the maximum number of unicast DCI may be: one unicast DCI scheduling DL and one unicast DCI scheduling UL for FDD; one unicast DCI scheduling DL and two unicast DCI scheduling UL for TDD; two unicast DCI scheduling DL and one unicast DCI scheduling UL for TDD.

In some embodiments, the maximum number of unicast DCI that can be decoded by UE for the scheduled PCell with two scheduling cells is determined across the set of monitoring occasions within a time gap of one of the scheduling cells. This ensures the maximum number of unicast DCI that can be decoded by UE of a scheduled cell with two scheduling cells is determined clearly when the PCell is scheduled by SCell. This avoids the potential issue of PDCCH missing detection that otherwise would have occurred when the maximum number of unicast DCI that can be decoded by UE on the UE side is different from that on the gNB side.

Example Embodiment 4

The disclosed technology can be implemented based on some embodiments to determine the maximum number of unicast DCI that can be decoded by UE for the scheduled cell per span of the scheduling cell, according to at least one of: SCS relationship between the scheduling cell and the scheduled cell, and per N spans. Optionally, for the scheduling cell and the scheduled cell are both with a span-based monitoring feature (i.e. FG3-5b) and have different SCS.

In a carrier aggregation scenario, the configuring Cell A supports a self-scheduling scheme. For Cell B, the configuring of Cell B is scheduled by Cell A. The maximum number of unicast DCI that can be decoded by UE for the scheduled cell B should be determined.

The subcarrier spacing (SCS) of Cell A is $\mu 1$, and the SCS of Cell B is $\mu 2$. The potential values of the SCS are 15 kHz, 30 kHz, 60 kHz, 120 kHz or other values.

For the scheduled Cell B, the maximum number of unicast DCI that can be decoded by UE for the scheduled cell per span of the scheduling cell is determined according to at least one of: SCS relation of the scheduling cell and the scheduled cell, per N spans. Optionally, the maximum number of unicast DCI is one unicast DCI scheduling DL and one unicast DCI scheduling UL for FDD; one unicast DCI scheduling DL and two unicast DCI scheduling UL for TDD; two unicast DCI scheduling DL and one unicast DCI scheduling UL for TDD.

Method 1: Determine per span or per slot of the scheduling cell according to the SCS size relationship between the scheduling cell and the scheduled cell. When the SCS of the scheduling cell is smaller than the SCS of the scheduled cell (small SCS scheduling large SCS), using per span of the scheduling cell. When the SCS of the scheduling cell is larger than the SCS of the scheduled cell, using per span of the scheduling cell.

Method 2: Determine per N span(s) of the scheduling cell.

Figure 9:
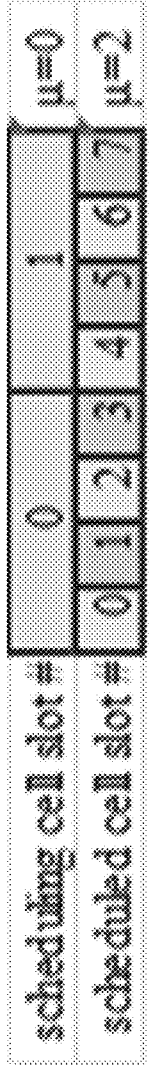
FIG. 9 shows an example of determining the maximum number of unicast DCI that can be decoded by UE is determined across a set of monitoring occasions per span of the scheduling cell.
Figure 10:
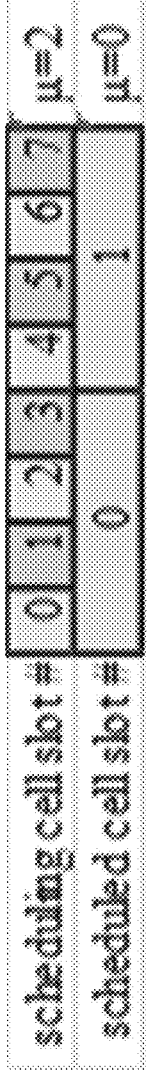
FIG. 10 shows an example of determining the maximum number of unicast DCI that can be decoded by UE is determined across a set of monitoring occasions per N spans of the scheduling cell.

In an embodiment where FDD is used as an example with Method 2, the maximum number of unicast DCI that can be decoded by UE is determined across the set of monitoring occasions per N span(s) of the scheduling cell. For example, in FIG. 9, when the SCS of the scheduling cell is smaller than the SCS of the scheduled cell (small SCS scheduling large SCS), one of the scheduling cells is determined by configuring per N=1 span of the scheduling cell. Then the maximum number of unicast DCI that can be decoded by UE for the scheduled cell may be: one unicast DCI scheduling DL and one unicast DCI scheduling UL across the set of monitoring occasions within a span of the scheduling cell. In FIG. 10, when the SCS of the scheduling cell is larger than the SCS of the scheduled cell, one of the scheduling cells is determined by configuring per N=2 spans of the scheduling cell. Then the maximum number of unicast DCI that can be decoded by UE for the scheduled cell may be: one unicast DCI scheduling DL and one unicast DCI scheduling UL across the set of monitoring occasions per N=2 spans of the scheduling cell.

Example Embodiment 5

In a carrier aggregation scenario, the configuring of the P(S)Cell (referred to as "Cell A") can be scheduled by SCell (referred to as "Cell B"), and Cell A can also support a self-scheduling scheme. For Cell B, the configuring cell B is a scheduling cell and supports the scheduling of Cell A. Then Cell A has two scheduling cells, which are Cell A (the first scheduling cell) and Cell B (the second scheduling cell). The time for PDSCH/PUSCH processing procedure on the scheduled Cell A with two scheduling cells should be determined.

The subcarrier spacing (SCS) of Cell A is $\mu 1$, and the SCS of Cell B is $\mu 2$. The potential values of the SCS are 15 kHz, 30 kHz, 60 kHz, 120 kHz or other values.

For the PDSCH processing procedure time, $N_1$ is based on $\mu$ of Table 1 and Table 2 below for UE processing capability 1 and 2, respectively, where $\mu$ corresponds to the one of $(\mu_{PDCCH}, \mu_{PDSCH}, \mu_{UL})$ resulting with the largest $T_{proc,1}$, where the $\mu_{PDCCH}$ corresponds to the subcarrier spacing of the PDCCH scheduling the PDSCH, the $\mu_{PDSCH}$ corresponds to the subcarrier spacing of the scheduled PDSCH, and $\mu_{UL}$ corresponds to the subcarrier spacing of the uplink channel with which the HARQ-ACK is to be transmitted.

If the first uplink symbol of the PUCCH that carries the HARQ-ACK information, as defined by the assigned HARQ-ACK timing $K_1$ and the PUCCH resource to be used and including the effect of the timing advance, starts no earlier than at symbol $L_1$, where $L_1$ is defined as the next uplink symbol with its CP starting after $T_{proc,1}=(N_1+d_{1,1})(2048+144)\cdot\kappa 2^{-\mu}\cdot T_c$ after the end of the last symbol of the PDSCH carrying the TB being acknowledged, then the UE shall provide a valid HARQ-ACK message.

$N_1$ is based on $\mu$ of Table 1 and Table 2 for UE processing capability 1 and 2 respectively, where $\mu$ corresponds to the one of $(\mu_{PDCCH}, \mu_{PDSCH}, \mu_{UL})$ resulting with the largest $T_{proc,1}$, where the $\mu_{PDCCH}$ corresponds to the subcarrier spacing of the PDCCH scheduling the PDSCH, the $\mu_{PDSCH}$ corresponds to the subcarrier spacing of the scheduled PDSCH, and $\mu_{UL}$ corresponds to the subcarrier spacing of the uplink channel with which the HARQ-ACK is to be transmitted, and $\kappa=T_s/T_c=64$, wherein $T_s=1/(\Delta f_{ref}*N_{f,ref})$, $\Delta f_{ref}=15\cdot10^3$ Hz and $N_{f,ref}=2048$, $T_c=1/(\Delta f_{max}\cdot N_f)$ where $\Delta f_{max}=480\cdot10^3$ Hz and $N_f=4096$.

If the PDSCH DM-RS position $l_1$ for the additional DM-RS is $l_1=12$ then $N_{1,0}=14$ in Table 1 below, otherwise $N_{1,0}=13$.

If the UE is configured with multiple active component carriers, the first uplink symbol which carries the HARQ-ACK information further includes the effect of timing difference between the component carriers.

For the PDSCH mapping type A: if the last symbol of PDSCH is on the i-th symbol of the slot where i<7, then $d_{1,1}=7-i$, otherwise $d_{1,1}=0$.

For UE processing capability 1: if the PDSCH is mapping type B, and if the number of PDSCH symbols allocated is 7, then $d_{1,1}=0$, if the number of PDSCH symbols allocated is 4, then $d_{1,1}=3$, and if the number of PDSCH symbols allocated is 2, then $d_{1,1}=3+d$, where d is the number of overlapping symbols of the scheduling PDCCH and the scheduled PDSCH.

For UE processing capability 2: if the PDSCH is mapping type B, if the number of PDSCH symbols allocated is 7, then $d_{1,1}=0$, and if the number of PDSCH symbols allocated is 4, then $d_{1,1}$ is the number of overlapping symbols of the scheduling PDCCH and the scheduled PDSCH, and if the number of PDSCH symbols allocated is 2, if the scheduling PDCCH was in a 3-symbol CORESET and the CORESET and the PDSCH had the same starting symbol, then $d_{1,1}=3$, and otherwise $d_{1,1}$ is the number of overlapping symbols of the scheduling PDCCH and the scheduled PDSCH.

For UE processing capability 2 with scheduling limitation when $\mu_{PDSCH}=1$, if the scheduled RB allocation exceeds 136 RBs, the UE defaults to capability 1 processing time. The UE may skip decoding a number of PDSCHs with last symbol within 10 symbols before the start of a PDSCH that is scheduled to follow Capability 2, if any of those PDSCHs are scheduled with more than 136 RBs with 30 kHz SCS and following Capability 1 processing time.

For a UE that supports capability 2 on a given cell, the processing time according to UE processing capability 2 is applied if the high layer parameter processingType2Enabled in PDSCH-ServingCellConfig is configured for the cell and set to enable.

If this PUCCH resource is overlapping with another PUCCH or PUSCH resource, then HARQ-ACK is multiplexed, otherwise the HARQ-ACK message is transmitted on PUCCH.

Otherwise the UE may not provide a valid HARQ-ACK corresponding to the scheduled PDSCH. The value of $T_{proc,1}$ is used both in the case of normal and extended cyclic prefix.

TABLE 1

| | PDSCH processing time for PDSCH processing capability 1 | |
|---|---|---|
| | PDSCH decoding time $N_1$ [symbols] | |
| $\mu$ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

TABLE 2

| | PDSCH processing time for PDSCH processing capability 2 |
|---|---|
| $\mu$ | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
| 0 | 3 |
| 1 | 4.5 |
| 2 | 9 for frequency range 1 |

In a case of the PDSCH on Cell A with two scheduling cells, the PDCCH scheduling the PDSCH may be from one of the two scheduling cells. PDSCH processing procedure time is determined using one of following methods.

Method 1: $N_1$ is based on $\mu$, where $\mu$ corresponds to the one of ($\mu1_{PDCCH}$, $\mu2_{PDCCH}$, $\mu_{PDSCH}$, $\mu_{UL}$) resulting with the largest $T_{proc,1}$ where the $\mu1_{PDCCH}$ and $\mu2_{PDCCH}$ corresponds to the subcarrier spacing of the PDCCH on the two scheduling cells scheduling the PDSCH respectively.

Method 2: $N_1$ is based on $\mu$, where $\mu$ corresponds to the one of ($\mu_{PDCCH}$, $\mu_{PDSCH}$, $\mu_{UL}$) resulting with the largest $T_{proc,1}$, where the $\mu_{PDCCH}$ corresponds to the minimum subcarrier spacing of the PDCCH on the two scheduling cells scheduling the PDSCH.

Method 3: When the USSs for scheduling Cell A are all on configured Cell B, then $N_1$ is based on $\mu$, where $\mu$ corresponds to the one of ($\mu_{PDCCH}$, $\mu_{PDSCH}$, $\mu_{UL}$) with the largest $T_{proc,1}$, where the $\mu_{PDCCH}$ corresponds to the subcarrier spacing of the PDCCH on the second scheduling cell (Cell B) scheduling the PDSCH. Otherwise, Method 1 or 2 is used.

In the embodiment discussed above, PDSCH processing procedure time is used as an example, but the same principle applies to the PUSCH processing procedure time. PCell is used as an example in the embodiment, but the same principle applies to the PSCell.

Example Embodiment 6

In a carrier aggregation scenario, the configuring of the P(S)Cell (referred to as "Cell A") can be scheduled by SCell (referred to as "Cell B"), and Cell A can also support a self-scheduling scheme. For Cell B, the configuring Cell B is a scheduling cell and supports the scheduling of Cell A. Then the Cell A has two scheduling cells, which are Cell A (the first scheduling cell) and Cell B (the second scheduling cell). The PDSCH reception preparation time on the scheduled cell A with two scheduling cells should be determined.

The subcarrier spacing (SCS) of cell A is $\mu1$, and the SCS of cell B is $\mu2$. The potential values of the SCS are 15 kHz, 30 kHz, 60 kHz and 120 kHz.

This scheme applies if the PDCCH carrying the scheduling DCI is received on one carrier with one OFDM subcarrier spacing ($\mu_{PDCCH}$), and the PDSCH scheduled to be received by the DCI is on another carrier with another OFDM subcarrier spacing ($\mu_{PDCCH}$).

If the $\mu_{PDCCH} < \mu_{PDSCH}$, the UE is expected to receive the scheduled PDSCH, if the first symbol in the PDSCH allocation, including the DM-RS, as defined by the slot offset $K_0$ and the start and length indicator SLIV of the scheduling DCI starts no earlier than the first symbol of the slot of the PDSCH reception starting at least $N_{pdsch}$ PDCCH symbols after the end of the PDCCH scheduling the PDSCH, not taking into account the effect of receive timing difference between the scheduling cell and the scheduled cell.

If the $\mu_{PDCCH} > \mu_{PDSCH}$, the UE is expected to receive the scheduled PDSCH, if the first symbol in the PDSCH allocation, including the DM-RS, as defined by the slot offset $K_0$ and the start and length indicator SLIV of the scheduling DCI starts no earlier than $N_{pdsch}$ PDCCH symbols after the end of the PDCCH scheduling the PDSCH, not taking into account the effect of receive timing difference between the scheduling cell and the scheduled cell.

TABLE 3

| | $N_{pdsch}$ as a function of the subcarrier spacing of the scheduling PDCCH |
|---|---|
| $\mu_{PDCCH}$ | $N_{pdsch}$ [symbols] |
| 0 | 4 |
| 1 | 5 |
| 2 | 10 |
| 3 | 14 |

For PDSCH reception preparation time, in a case of the PDSCH on Cell A with two scheduling cells, the PDCCH scheduling this PDSCH may be from one of the two scheduling cells. PDSCH reception preparation time is determined by one of following methods.

Method 1: PDSCH reception preparation time is supported only when the USS for scheduling Cell A are all on configured Cell B.

Method 2: PDSCH reception preparation time of sSCell-schedule-PCell is determined by the PDCCH on the sSCell and the PDSCH on the PCell/PSCell, and is also applied to the PDSCH on Cell A with self-scheduling.

Method 3: Define different UE capability for PDSCH reception preparation time. One capability with only one time of PDSCH reception preparation time, i.e. determined by the PDCCH on the sSCell and the PDSCH on the PCell/PSCell, and applied to both Cell A self-scheduling and Cell B scheduling Cell A. Another capability with two times of PDSCH reception preparation time, i.e. one is determined by the PDCCH on the sSCell and the PDSCH on the PCell/PSCell and only applied to Cell B scheduling Cell A, the other is zero and only applied to Cell A self-scheduling.

Example Embodiment 7

When a one-to-two scheduling scheme is supported, the maximum number of unicast DCI that UE can decode is determined per slot/span on the scheduling cell per each scheduled cell or per two scheduled cells. In some implementations, the example embodiment 7 can also be used for one-to-multiple scheduling.

In a carrier aggregation scenario, the configuring of the PCell (referred to as "Cell A") is a self-scheduling scheme. For Cell B, the configuring Cell B is a scheduled cell, and scheduled by Cell A. Two PDSCHs on two cells (Cell A and Cell B) are scheduled by a single DCI on Cell A. Alternatively, for Cell C, the configuring Cell C is a scheduled cell, and scheduled by Cell A, and two PDSCHs on two cells (Cell B and Cell C) are scheduled by single DCI on cell A. When two PDSCHs on two cells scheduled by a single DCI, the maximum number of unicast DCI that can be decoded by UE for the scheduled cell(s) should be determined. In some implementations, these methods can also be used for N PDSCHs on N cells scheduled by a single DCI.

The subcarrier spacing (SCS) of Cell A is μ1, and the SCS of Cell B is μ2. The potential values of the SCS are 15 kHz, 30 kHz, 60 kHz, 120 kHz or other values.

When two PDSCHs on two cells are scheduled by a single DCI, the maximum number of unicast DCI that can be decoded by UE for the scheduled cell(s) across the set of monitoring occasions within a slot/span of the scheduling cell is determined by one of the following methods. Optionally, the maximum number of unicast DCI may be: one unicast DCI scheduling DL and one unicast DCI scheduling UL for FDD; one unicast DCI scheduling DL and two unicast DCI scheduling UL for TDD; two unicast DCI scheduling DL and one unicast DCI scheduling UL for TDD. In some implementations, these methods can also be used for N PDSCHs on N cells scheduled by a single DCI.

Method 1: The maximum number of unicast DCI scheduling DL that can be decoded by UE across the set of monitoring occasions within a slot/span of the scheduling cell is determined per scheduled two cells. In this case, for the two scheduled cells, the maximum number of unicast DCI scheduling DL that can be decoded by UE across the set of monitoring occasions within a slot/span of the scheduling cell is one for FDD, which is the single DCI scheduling two PDSCH on two cells. In some implementations, these methods can also be used for N PDSCHs on N cells scheduled by a single DCI. In this case, the maximum number of unicast DCI scheduling DL that can be decoded by UE across the set of monitoring occasions within a slot/span of the scheduling cell is determined per scheduled N cells.

Method 2: The maximum number of unicast DCI scheduling DL that can be decoded by UE across the set of monitoring occasions within a slot/span of the scheduling cell is determined per scheduled cell. In this case, for each cell of the two scheduled cells, the maximum number of unicast DCI scheduling DL that can be decoded by UE across the set of monitoring occasions within a slot/span of the scheduling cell is one for FDD, and the DL DCI for the first scheduled cell and the DL DCI for the second scheduled cell is the same, which is the single DCI scheduling two PDSCH on two cells. In some implementations, these methods can also be used for N PDSCHs on N cells scheduled by a single DCI. In the case of N PDSCHs on N cells scheduled by a single DCI, for each cell of the N scheduled cells, the maximum number of unicast DCI scheduling DL that can be decoded by UE across the set of monitoring occasions within a slot/span of the scheduling cell is one for FDD, and the DL DCI for the first scheduled cell and the DL DCI for each of the other scheduled cells is the same, which is the single DCI scheduling N PDSCH on N cells.

Method 3: The maximum number of unicast DCI scheduling DL that can be decoded by UE across the set of monitoring occasions within a slot/span of the scheduling cell is determined per scheduled cell. In this case, for each cell of the two scheduled cells, the maximum number of unicast DCI scheduling DL that can be decoded by UE across the set of monitoring occasions within a slot/span of the scheduling cell is one for FDD, and the single DCI scheduling two PDSCH on two cells is only counted in one of the two scheduled cells. Further, for the other cell of the two scheduled cells, UE can decode another unicast DL DCI, which can be the legacy DCI or can be the single DCI scheduling two PDSCH on two cells. Optionally, the single DCI scheduling two PDSCH on two cells is only counted in one of the two scheduled cells, which can select the cells, both the scheduling cell and the scheduled cell, i.e. Cell A in the case of the single DCI on Cell A to schedule PDSCH on Cell A and PDSCH on Cell B. In some implementations, these methods can also be used for N PDSCHs on N cells scheduled by a single DCI. In the case of N PDSCHs on N cells scheduled by a single DCI, the maximum number of unicast DCI scheduling DL that can be decoded by UE across the set of monitoring occasions within a slot/span of the scheduling cell is one for FDD, and the single DCI scheduling N PDSCH on N cells is only counted in one of the N scheduled cells. Further, for each of the other cells of the N scheduled cells, UE can decode another unicast DL DCI, which can be the legacy DCI or can be the single DCI scheduling N PDSCH on N cells.

Method 4: The maximum number of unicast DCI scheduling DL that can be decoded by UE across the set of monitoring occasions within a slot/span of the scheduling cell is determined per two scheduled cells. In this case, for each cell of the two scheduled cells, the maximum number of unicast DCI scheduling DL that can be decoded by UE across the set of monitoring occasions within a slot/span of the scheduling cell is two for FDD, and at least one of the two DL DCI is the single DCI scheduling two PDSCH on two cells. Note, it can also be used for N PDSCHs on N cells scheduled by a single DCI. In the case of N PDSCHs on N cells scheduled by a single DCI, the maximum number of unicast DCI scheduling DL that can be decoded by UE across the set of monitoring occasions within a slot/span of the scheduling cell is determined per N scheduled cells. For each cell of the N scheduled cells, the maximum number of unicast DCI scheduling DL that can be decoded by UE across the set of monitoring occasions within a slot/span of the scheduling cell is N for FDD, and at least one of the N DL DCI is the single DCI scheduling N PDSCH on N cells.

Although the FDD is used as an example in some embodiments discussed in this patent document, the same principle applies to the TDD. Likewise, although PCell is used as an example in some embodiments discussed in this patent document, the same principle applies to PSCell.

Example Embodiment 8

In Rel-15, PDSCH processing time for PDSCH processing capability 1 and capability 2 depend on whether an additional DMRS is configured.

For the PDSCH processing procedure time, $N_1$ is based on $\mu$ of Table 1 and Table 2 below for UE processing capability 1 and 2, respectively, where $\mu$ corresponds to the one of ($\mu_{PDCCH}$, $\mu_{PDSCH}$, $\mu_{UL}$) resulting with the largest $T_{proc,1}$, where the $\mu_{PDCCH}$ corresponds to the subcarrier spacing of the PDCCH scheduling the PDSCH, the $\mu_{PDSCH}$ corresponds to the subcarrier spacing of the scheduled PDSCH, and $\mu_{UL}$ corresponds to the subcarrier spacing of the uplink channel with which the HARQ-ACK is to be transmitted.

If the first uplink symbol of the PUCCH that carries the HARQ-ACK information, as defined by the assigned HARQ-ACK timing $K_1$ and the PUCCH resource to be used and including the effect of the timing advance, starts no earlier than at symbol $L_1$, where $L_1$ is defined as the next uplink symbol with its CP starting after $T_{proc,1}=(N_1+d_{1,1})$ $(2048+144)\cdot\kappa2^{-\mu}\cdot T_c$ after the end of the last symbol of the PDSCH carrying the TB being acknowledged, then the UE shall provide a valid HARQ-ACK message.

$N_1$ is based on $\mu$ of Table 1 and Table 2 for UE processing capability 1 and 2 respectively, where $\mu$ corresponds to the one of ($\mu_{PDCCH}$, $\mu_{PDSCH}$, $\mu_{UL}$) resulting with the largest $T_{proc,1}$, where the $\mu_{PDCCH}$ corresponds to the subcarrier spacing of the PDCCH scheduling the PDSCH, the $\mu_{PDSCH}$ corresponds to the subcarrier spacing of the scheduled PDSCH, and $\mu_{UL}$ corresponds to the subcarrier spacing of the uplink channel with which the HARQ-ACK is to be transmitted, and $\kappa=T_s/T_c=64$, wherein $T_s=1/(\Delta f_{ref}*N_{f,ref})$, $\Delta f_{ref}=15\cdot10^3$ Hz and $N_{f,ref}=2048$, $T_c=1/(\Delta f_{max}\cdot N_f)$ where $\Delta f_{max}=480\cdot10^3$ Hz and $N_f=4096$.

If the PDSCH DM-RS position $l_1$ for the additional DM-RS is $l_1=12$ then $N_{1,0}=14$ in Table 1 below, otherwise $N_{1,0}=13$.

If the UE is configured with multiple active component carriers, the first uplink symbol which carries the HARQ-ACK information further includes the effect of timing difference between the component carriers.

For the PDSCH mapping type A: if the last symbol of PDSCH is on the i-th symbol of the slot where i<7, then $d_{1,1}=7-i$, otherwise $d_{1,1}=0$.

For UE processing capability 1: if the PDSCH is mapping type B, and if the number of PDSCH symbols allocated is 7, then $d_{1,1}=0$, if the number of PDSCH symbols allocated is 4, then $d_{1,1}=3$, and if the number of PDSCH symbols allocated is 2, then $d_{1,1}=3+d$, where d is the number of overlapping symbols of the scheduling PDCCH and the scheduled PDSCH.

For UE processing capability 2: if the PDSCH is mapping type B, if the number of PDSCH symbols allocated is 7, then $d_{1,1}=0$, and if the number of PDSCH symbols allocated is 4, then $d_{1,1}$ is the number of overlapping symbols of the scheduling PDCCH and the scheduled PDSCH, and if the number of PDSCH symbols allocated is 2, if the scheduling PDCCH was in a 3-symbol CORESET and the CORESET and the PDSCH had the same starting symbol, then $d_{1,1}=3$, and otherwise $d_{1,1}$ is the number of overlapping symbols of the scheduling PDCCH and the scheduled PDSCH.

For UE processing capability 2 with scheduling limitation when $\mu_{PDSCH}=1$, if the scheduled RB allocation exceeds 136 RBs, the UE defaults to capability 1 processing time. The UE may skip decoding a number of PDSCHs with last symbol within 10 symbols before the start of a PDSCH that is scheduled to follow Capability 2, if any of those PDSCHs are scheduled with more than 136 RBs with 30 kHz SCS and following Capability 1 processing time.

For a UE that supports capability 2 on a given cell, the processing time according to UE processing capability 2 is applied if the high layer parameter processingType2Enabled in PDSCH-ServingCellConfig is configured for the cell and set to enable.

If this PUCCH resource is overlapping with another PUCCH or PUSCH resource, then HARQ-ACK is multiplexed, otherwise the HARQ-ACK message is transmitted on PUCCH.

Otherwise the UE may not provide a valid HARQ-ACK corresponding to the scheduled PDSCH. The value of $T_{proc,1}$ is used both in the case of normal and extended cyclic prefix. See Table 1 and Table 2 above.

New DMRS parameters dmrs-DownlinkForPDSCH-MappingTypeA-DCI-1-2 and dmrs-DownlinkForPDSCH-MappingTypeB-DCI-1-2 are introduced for DCI format 1_2 in Rel-16 URLLC WI, and they have not been reflected in the current Rel-16 specification. There could be four methods to include the new introduced RRC parameters for DCI format 1_2. The disclosed technology can be implemented in some embodiments to use one of the methods listed below to resolve the issue.

Method 1: PDSCH processing time is independent of DCI formats. That is, only when dmrs-AdditionalPosition='pos0' is configured in DMRS-DownlinkConfig in all of dmrs-DownlinkForPDSCH-MappingTypeA, dmrs-DownlinkForPDSCH-MappingTypeB, dmrs-DownlinkForPDSCH-MappingTypeA-DCI-1-2 and dmrs-DownlinkForPDSCH-MappingTypeB-DCI-1-2, the PDSCH decoding time $N_1$ follows the shortened processing time for PDSCH processing capability 1 or it is an allowed case for PDSCH processing capability 2. This method will lead to a unified $N_1$ regardless of any DCI formats, but would cause a larger processing time even when a PDSCH is not scheduled with additional DMRS for PDSCH processing capability 1, and it would restrict the scheduling for PDSCH processing capability 2. For example, Method 1 is corresponding to Table 1-1 and Table 2-1.

TABLE 1-1

| | PDSCH processing time for PDSCH processing capability 1 | |
|---|---|---|
| | PDSCH decoding time $N_1$ [symbols] | |
| $\mu$ | dmrs-AdditionalPosition = pos0 in DMRS-DownlinkConfig in all of dmrs-DownlinkForPDSCH-MappingTypeA, dmrs-DownlinkForPDSCH-MappingTypeB, dmrs-DownlinkForPDSCH-MappingTypeA-DCI-1-2, dmrs-DownlinkForPDSCH-MappingTypeB-DCI-1-2 | dmrs-AdditionalPosition ≠ pos0 in DMRS-DownlinkConfig in one of dmrs-DownlinkForPDSCH-MappingTypeA, dmrs-DownlinkForPDSCH-MappingTypeB, dmrs-DownlinkForPDSCH-MappingTypeA-DCI-1-2, dmrs-DownlinkForPDSCH-MappingTypeB-DCI-1-2 or if the higher layer parameter is not configured |
| 0 | 8 | $N_{1, 0}$ |
| 1 | 10 | 13 |
| 2 | 17 | 20 |
| 3 | 20 | 24 |

TABLE 2-1

| | PDSCH processing time for PDSCH processing capability 2 |
|---|---|
| $\mu$ | PDSCH decoding time $N_1$ [symbols] dmrs-AdditionalPosition = pos0 in DMRS-DownlinkConfig in all of dmrs-DownlinkForPDSCH-MappingTypeA, dmrs-DownlinkForPDSCH-MappingTypeB, dmrs-DownlinkForPDSCH-MappingTypeA-DCI-1-2, dmrs-DownlinkForPDSCH-MappingTypeB-DCI-1-2 |
| 0 | 3 |
| 1 | 4.5 |
| 2 | 9 for frequency range 1 |

Method 2: PDSCH processing time is defined per DMRS configuration. In other words, the PDSCH processing time can be different for PDSCH scheduled by a legacy DCI format (i.e., DCI format 11) and new DCI format (i.e., DCI format 1_2). This is more flexible, while it requires LUE to dynamically change the LUE PDSCH processing time for different PDSCHs scheduled by different DCI formats. For example, Method 2 corresponds to Table 1-2 and Table 2-2.

TABLE 1-2

| | PDSCH processing time for PDSCH processing capability 1 | |
|---|---|---|
| | PDSCH decoding time $N_1$ [symbols] | |
| $\mu$ | dmrs-AdditionalPosition = pos0 in DMRS-DownlinkConfig in both of dmrs-DownlinkForPDSCH-MappingTypeA, dmrs-DownlinkForPDSCH-MappingTypeB for DCI format 1_1, or in both of dmrs-DownlinkForPDSCH-MappingTypeA-DCI-1-2, dmrs-DownlinkForPDSCH-MappingTypeB-DCI-1-2 for DCI format 1_2 | dmrs-AdditionalPosition ≠ pos0 in DMRS-DownlinkConfig in either of dmrs-DownlinkForPDSCH-MappingTypeA, dmrs-DownlinkForPDSCH-MappingTypeB for DCI format 1_1, or in either of dmrs-DownlinkForPDSCH-MappingTypeA-DCI-1-2, dmrs-DownlinkForPDSCH-MappingTypeB-DCI-1-2 for DCI format 1_2 or if the higher layer parameter is not configured |
| 0 | 8 | $N_{1, 0}$ |
| 1 | 10 | 13 |
| 2 | 17 | 20 |
| 3 | 20 | 24 |

TABLE 2-2

PDSCH processing time for PDSCH processing capability 2

| μ | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-MappingTypeB for DCI format 1_1, or in both of dmrs-DownlinkForPDSCH-MappingTypeA-DCI-1-2, dmrs-DownlinkForPDSCH-MappingTypeB-DCI-1-2 for DCI format 1_2 |
|---|---|
| 0 | 3 |
| 1 | 4.5 |
| 2 | 9 for frequency range 1 |

Method 3: PDSCH processing time is independent of DCI formats for PDSCH processing time for PDSCH processing capability 1, and the PDSCH processing time is defined per DMRS configuration for PDSCH processing time for PDSCH processing capability 2. For example, Method 3 corresponds to Table 1-1 and Table 2-2.

Method 4: PDSCH processing time is independent of DCI formats for PDSCH processing time for PDSCH processing capability 2, and the PDSCH processing time is defined per DMRS configuration for PDSCH processing time for PDSCH processing capability 1. For example, Method 4 corresponds to Table 1-2 and Table 2-1.

The disclosed technology can be implemented in some embodiments to determine the maximum number of DCIs that the UE can handle.

In an implementation, when a scheduled cell has two scheduling cells, the time granularity (MO set per time gap) for processing the maximum number of DCIs and the cell determination method are as follows:

When the same per slot monitoring capability (e.g., FG 3-1): when different SCS, PCell or sSCell or max SCS or min SCS is used to determine the cell with the maximum number of DCIs per slot, the same SCS can be determined per slot of any scheduling cell.

When the same per slot monitoring capability (e.g., FG 3-5b): when SCS are different, Method1 is determined according to the SCS size relationship between PCell and sSCell. When the SCS of the sSCell is smaller than the SCS of the PCell (small SCS scheduling large SCS), the span is determined based on sSCell. When the SCS of sSCell is greater than the SCS of PCell (large SCS scheduling small SCS), Alternative 1 is performed per slot of sSCell. The maximum number of DCI processing opportunities for one time is determined per span of the PCell. Method2 configures per N spans of sSCell or per span of PCell as a processing time unit, that is, per N spans of sSCell or per span of PCell is used to determine the number of DCIs processed by the scheduled cell. For example, when the SCS of the sSCell is smaller than the SCS of the PCell (small SCS scheduling large SCS), N=1 is configured. When the SCS of the sSCell is greater than the SCS of PCell (large SCS scheduling small SCS), N=2 is configured. Method3 is based on the cell priority. Method4 provides that when the USSs for scheduling PCell are all on sSCell, sSCell is selected as the scheduling cell. When the USS for scheduling PCell is on both PCell and sSCell, Method 1, 2, or 3 is used.

When the SCS is the same, in some implementations, Method 1 may be used. Step1: first selects the scheduling cell according to the combination (X, Y) priority. Step 2: if (X, Y) are the same, the scheduling cell is selected according to the span number priority. Step 3: if (X, Y) are the same and the number of spans is also the same, the scheduling cell is selected according to the cell priority. Method 2 may also be used. The scheduling cell is selected directly according to the cell priority. Method 3 may also be used when the USS for scheduling PCell is all on sSCell. The sSCell is selected as a scheduling cell. When the USS for scheduling PCell is on both PCell and sSCell, Method 1 or 2 is used.

With respect to the combination (X, Y) priority, Alternative 1 determines per span of the MO set with the cell with the smaller X value. Alternative 2 determines per span of the MO set with the cell with the larger X value. For a cell, when multiple (X, Y) are reported, the above X is the X used to determine the span of the cell.

With respect to the priority of the number of spans, Alternative 1 gives the priority to cells with a larger number of spans to determine per span of the MO set. Alternative 2 gives the priority to cells with a smaller number of spans to determine per span of the MO set.

With respect to the cell priority, Alternative 1 prioritizes PCell to determine per span of the MO set. Alternative 2 prioritizes sSCell to determine per span of the MO set. Alternative 3 corresponds to the larger SCS and Alternative 4 corresponds to the smaller SCS.

In another implementation, when two PDSCHs on two cells are scheduled by single DCI, the method for determining the maximum number of DCIs at this time is as follows.

Method1: Per scheduled two-cell processes 1 DL DCI. Only one DL DCI is processed by two cells.

Method2: Per scheduled cell processes 1 DL DCI. Each cell regards it as 1 DL DCI processed by the cell.

Method3: Per scheduled cell processes 1 DL DCI. One two-cell scheduling DCI sent by gNB per slot is only included in one cell and used as one DL DCI processed by it. The second two-cell scheduling DCI or the other one can be processed. For the legacy DL DCI of another cell, it is included in the other cell and treated as 1 DL DCI.

Method 4: Per scheduled two cells process 2 DL DCIs, and one of the DL DCIs is two-cell scheduling DCI FIG. 11 shows an example of a process for wireless communication based on some example embodiments of the disclosed technology.

In some implementations, the process 1100 for wireless communication may include, at 1110, receiving, by a wireless device, a configuration from a network device, and at 1120, initiating, by the wireless device, a process to recover a link to a network based on information elements within the configuration associated with different criteria.

It will be appreciated that the present document discloses techniques that can be embodied in various embodiments to determine downlink control information in wireless networks. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network device includes a base station including a next generation Node B (gNB), enhanced Node B (eNB), or any other device that performs as a base station. A resource range may refer to a range of time-frequency resources or blocks.

Clause 1. A method for wireless communication, comprising performing, by a wireless device, a determination of a maximum number of downlink control information (DCI) decodable by the wireless device within a time gap of a scheduling cell per a first number of scheduled cells, wherein the DCI is used to schedule downlink (DL) data or uplink (UL) data.

Clause 2. The method of clause 1, wherein the time gap is a slot and the first number is one, and each scheduled cell has two scheduling cells, and wherein the maximum number of downlink control information (DCI) decodable by the wireless device is determined within a slot of one of two scheduling cells per scheduled cell.

Clause 3. The method of clause 2, wherein the one of the two scheduling cells includes one of: a first scheduling cell that is the scheduled cell also with self-scheduling; a second scheduling cell that is a scheduling cell other than the first scheduling cell; one of the two scheduling cells with a larger sub-carrier spacing (SCS); and one of the two scheduling cells with a smaller SCS.

Clause 4. The method of clause 1, wherein the time gap is a slot and the first number is one, and the scheduled cell has two scheduling cells, and wherein the maximum number of downlink control information (DCI) decodable by the wireless device is determined within a span of one of two scheduling cells per the scheduled cell.

Clause 5. The method of clause 4, wherein a determination of the one of the two scheduling cells comprise a priority rule associated with at least one of a cell, a number of spans, or a combination (X, Y), wherein X indicates a number of symbols corresponding to a minimum gap between starting symbols of two consecutive spans and Y indicates a maximum number of consecutive symbols for each span.

Clause 6. The method of clause 5, wherein the priority rule comprises: one of scheduling cells is selected based on the priority rule that is associated with the combination (X, Y) of each scheduling cell; in a case that the plurality of scheduling cells has an identical priority with respect to the combination (X, Y) of each scheduling cell, the one of the scheduling cells is selected based on the priority rule that is associated with the number of spans; and in a case that the plurality of scheduling cells has an identical priority with respect to the number of spans, the one of the scheduling cells is selected based on the priority rule that is associated with the cell.

Clause 7. The method of any of clauses 5-6, wherein the priority rule that is associated with the combination (X, Y) of each scheduling cell includes one of: selecting the one of the scheduling cells with a smaller X value than X values of other scheduling cells; and selecting the one of the scheduling cells with a larger X value than X values of other scheduling cells.

Clause 8. The method of any of clause 5-6, wherein the priority rule that is associated with the number of spans of each scheduling cell includes one of: selecting the one of the scheduling cells with more spans than other scheduling cells; and selecting the one of the scheduling cells with less spans than other scheduling cells.

Clause 9. The method of any of clause 5-6, wherein the priority rule that is associated with the cell includes one of: selecting a first scheduling cell of the scheduling cells that is a primary cell (PCell); and selecting a second scheduling cell of the scheduling cells that is a secondary cell (SCell) and is configured to schedule PCell.

Clause 10. The method of clause 4, wherein, in a case that all wireless device specific search spaces for scheduling a primary cell (PCell) are on a secondary cell (SCell) that is configured to schedule PCell, the SCell is selected as one of scheduling cells.

Clause 11. The method of any of clauses 4-10, wherein the scheduling cells have an identical subcarrier spacing (SCS).

Clause 12. The method of clause 4, wherein a determination of the one of the two scheduling cells is performed based on one of: a rule associated with a subcarrier spacing (SCS) relationship between the two scheduling cells; a configured cell and within a first number of spans, wherein the first number is greater than or equal to one; and a priority rule that is associated with a cell.

Clause 13. The method of clause 12, wherein the determination of the one of the scheduling cells based on the rule associated with an SCS relationship between the two scheduling cells includes at least one of: in case that the SCS of an SCell configured to schedule a PCell is smaller than the SCS of the PCell, the SCell is selected as the one of the scheduling cells; in case that the SCS of an SCell configured to schedule a PCell is larger than the SCS of the PCell, the PCell is selected as the one of the scheduling cells; or in case that the SCS of an SCell configured to schedule a PCell is larger than the SCS of the PCell, the PCell is selected as the one of the scheduling cells and per slot to process the maximum number of DCI.

Clause 14. The method of clause 12, wherein the determination of the one of the scheduling cells based on the configured cell and within first number of spans is performed: per multiple spans of an SCell in case that the SCS of the SCell is larger than the SCS of a PCell; or per span of the SCell in case that the SCS of the SCell is less than the SCS of the PCell.

Clause 15. The method of clause 12, wherein the one of the scheduling cells that is selected based on the priority rule that is associated with the cell includes one of: a PCell, an SCell, one of the scheduling cells with a larger SCS than other scheduling cells, and one of the scheduling cells with a smaller SCS than other scheduling cells.

Clause 16. The method of clause 1, wherein the time gap is a slot or a span, and multiple scheduled cells are scheduled by a single DCI, and wherein the maximum number of downlink control information (DCI) decodable by the wireless device is determined within a slot or a span of the scheduling cell per scheduled cell or per multiple scheduled cells.

Clause 17. The method of clause 16, wherein the maximum number of DCI decodable by the wireless device is: one DCI within a slot or a span per the first number of scheduled cells, and the one DCI is the single DCI used to schedule a first number of physical downlink shared channels (PDSCHs) or physical uplink shared channels (PUSCHs) on the first number of scheduled cells; or two DCIs within a slot or a span per the first number of scheduled cells, and one of the two DCIs is the single DCI used to schedule the first number of PDSCHs or PUSCHs on the first number of scheduled cells.

Clause 18. The method of clause 16, wherein the maximum number of DCI decodable by the wireless device is one DCI within a slot or a span per scheduled cell, and wherein the single DCI used to schedule a first number of PDSCHs or PUSCHs on a first number of scheduled cells is the one DCI for each scheduled cell, or the single DCI used to schedule the first number of PDSCHs or PUSCHs on the first number of scheduled cells is the one DCI for one of the first number of scheduled cells.

Clause 19. The method of any of clauses 4 or 16, wherein the span is a set of consecutive symbols in a slot in which the wireless device is used to monitor physical channel.

Clause 20. An apparatus for wireless communication comprising a processor that is configured to carry out the method of any of clauses 1 to 19.

Clause 21. A non-transitory computer readable medium having code stored thereon, the code when executed by a processor, causing the processor to implement a method recited in any of clauses 1 to 19.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:

performing, by a wireless device, a determination of a maximum number of downlink control information (DCI) decodable by the wireless device within a time gap of a scheduling cell per scheduled cell, wherein the time gap is a slot, and each scheduled cell has two scheduling cells, and wherein the maximum number of downlink control information (DCI) decodable by the wireless device is determined within a slot of one of two scheduling cells per scheduled cell, wherein the DCI is used to schedule downlink (DL) data or uplink (UL) data, wherein one of the two scheduling cells includes one of:

a first scheduling cell that is the scheduled cell also with self-scheduling;

a second scheduling cell that is a scheduling cell other than the first scheduling cell; or a scheduling cell with a smaller sub-carrier spacing (SCS).

2. The method of claim 1, wherein the time gap is a slot or a span, and multiple scheduled cells are scheduled by a single DCI, and wherein the maximum number of downlink control information (DCI) decodable by the wireless device is determined within a slot or a span of the scheduling cell per scheduled cell or per multiple scheduled cells.

3. The method of claim 2, wherein the maximum number of DCI decodable by the wireless device is:

one DCI within a slot or a span per the first number of scheduled cells, and the one DCI is the single DCI used to schedule a first number of physical downlink shared channels (PDSCHs) or physical uplink shared channels (PUSCHs) on the first number of scheduled cells; or two DCIs within a slot or a span per the first number of scheduled cells, and one of the two DCIs is the single DCI used to schedule the first number of PDSCHs or PUSCHs on the first number of scheduled cells.

4. The method of claim 2, wherein the maximum number of DCI decodable by the wireless device is one DCI within a slot or a span per scheduled cell, and wherein the single DCI used to schedule a first number of PDSCHs or PUSCHs on a first number of scheduled cells is the one DCI for each scheduled cell, or the single DCI used to schedule the first number of PDSCHs or PUSCHs on the first number of scheduled cells is the one DCI for one of the first number of scheduled cells.

5. A method for wireless communication, comprising:

performing, by a wireless device, a determination of a maximum number of downlink control information (DCI) decodable by the wireless device within a time gap of a scheduling cell per scheduled cell, wherein the DCI is used to schedule downlink (DL) data or uplink (UL) data, wherein the time gap is a span, and the scheduled cell has two scheduling cells, and wherein the maximum number of downlink control information (DCI) decodable by the wireless device is determined within a span of one of two scheduling cells per scheduled cell, wherein the span is a set of consecutive symbols in a slot specific to one of the two scheduling cells per scheduled cell.

6. The method of claim 5, wherein a determination of the one of the two scheduling cells comprise a priority rule associated with at least one of a cell, a number of spans, or a combination (X, Y), wherein X indicates a number of symbols corresponding to a minimum gap between starting symbols of two consecutive spans and Y indicates a maximum number of consecutive symbols for each span.

7. The method of claim 6, wherein the priority rule comprises:

one of scheduling cells is selected based on the priority rule that is associated with the combination (X, Y) of each scheduling cell;

in a case that a plurality of scheduling cells has an identical priority with respect to the combination (X, Y) of each scheduling cell, the one of the scheduling cells is selected based on the priority rule that is associated with the number of spans; and in a case that the plurality of scheduling cells has an identical priority with respect to the number of spans, the one of the scheduling cells is selected based on the priority rule that is associated with the cell.

8. The method of claim 6, wherein the priority rule that is associated with the combination (X, Y) of each scheduling cell includes one of:

selecting the one of the scheduling cells with a smaller X value than X values of other scheduling cells; and selecting the one of the scheduling cells with a larger X value than X values of other scheduling cells.

9. The method of claim 6, wherein the priority rule that is associated with the number of spans of each scheduling cell includes one of:

selecting the one of the scheduling cells with more spans than other scheduling cells; and selecting the one of the scheduling cells with less spans than other scheduling cells.

10. The method of claim 6, wherein the priority rule that is associated with the cell includes one of:

selecting a first scheduling cell of the scheduling cells that is a primary cell (PCell); and selecting a second scheduling cell of the scheduling cells that is a secondary cell (SCell) and is configured to schedule PCell.

11. The method of claim 5, wherein, in a case that all wireless device specific search spaces for scheduling a primary cell (PCell) are on a secondary cell (SCell) that is configured to schedule PCell, the SCell is selected as one of scheduling cells.

12. The method of claim 5, wherein the scheduling cells have an identical subcarrier spacing (SCS).

13. The method of claim 5, wherein a determination of the one of the two scheduling cells is performed based on one of:

a rule associated with a subcarrier spacing (SCS) relationship between the two scheduling cells;

a configured cell and within a first number of spans, wherein the first number is greater than or equal to one; and a priority rule that is associated with a cell.

14. The method of claim 13, wherein the determination of the one of the scheduling cells based on the rule associated with an SCS relationship between the two scheduling cells includes at least one of:

in case that the SCS of an SCell configured to schedule a PCell is smaller than the SCS of the PCell, the SCell is selected as the one of the scheduling cells;

in case that the SCS of an SCell configured to schedule a PCell is larger than the SCS of the PCell, the PCell is selected as the one of the scheduling cells; or in case that the SCS of an SCell configured to schedule a PCell is larger than the SCS of the PCell, the PCell is selected as the one of the scheduling cells and per slot to process the maximum number of DCI.

15. The method of claim 13, wherein the determination of the one of the scheduling cells based on the configured cell and within first number of spans is performed:

per multiple spans of an SCell in case that the SCS of the SCell is larger than the SCS of a PCell; or per span of the SCell in case that the SCS of the SCell is less than the SCS of the PCell.

16. The method of claim 13, wherein the one of the scheduling cells that is selected based on the priority rule that is associated with the cell includes one of: a PCell, an SCell, one of the scheduling cells with a larger SCS than other scheduling cells, and one of the scheduling cells with a smaller SCS than other scheduling cells.

17. The method of claim 5, wherein the span is a set of consecutive symbols in a slot in which the wireless device is used to monitor physical channel.

18. An apparatus for wireless communication comprising at least one processor that is configured to carry out a method, comprising:

performing, by a wireless device, a determination of a maximum number of downlink control information (DCI) decodable by the wireless device within a time gap of a scheduling cell per scheduled cell, wherein the time gap is a slot, and each scheduled cell has two scheduling cells, and wherein the maximum number of downlink control information (DCI) decodable by the wireless device is determined within a slot of one of two scheduling cells per scheduled cell, wherein the DCI is used to schedule downlink (DL) data or uplink (UL) data, wherein one of the two scheduling cells includes one of:

a first scheduling cell that is the scheduled cell also with self-scheduling;

a second scheduling cell that is a scheduling cell other than the first scheduling cell; or a scheduling cell with a smaller sub-carrier spacing (SCS).

* * * * *